SELF-PROPELLED IRRIGATION SYSTEM OF THE RECIPROCABLE CABLE TYPE WITH MOBILE SUPPORTS ACTUATED BY PROPELLING SHOES
Filed July 1, 1966 6 Sheets-Sheet 1
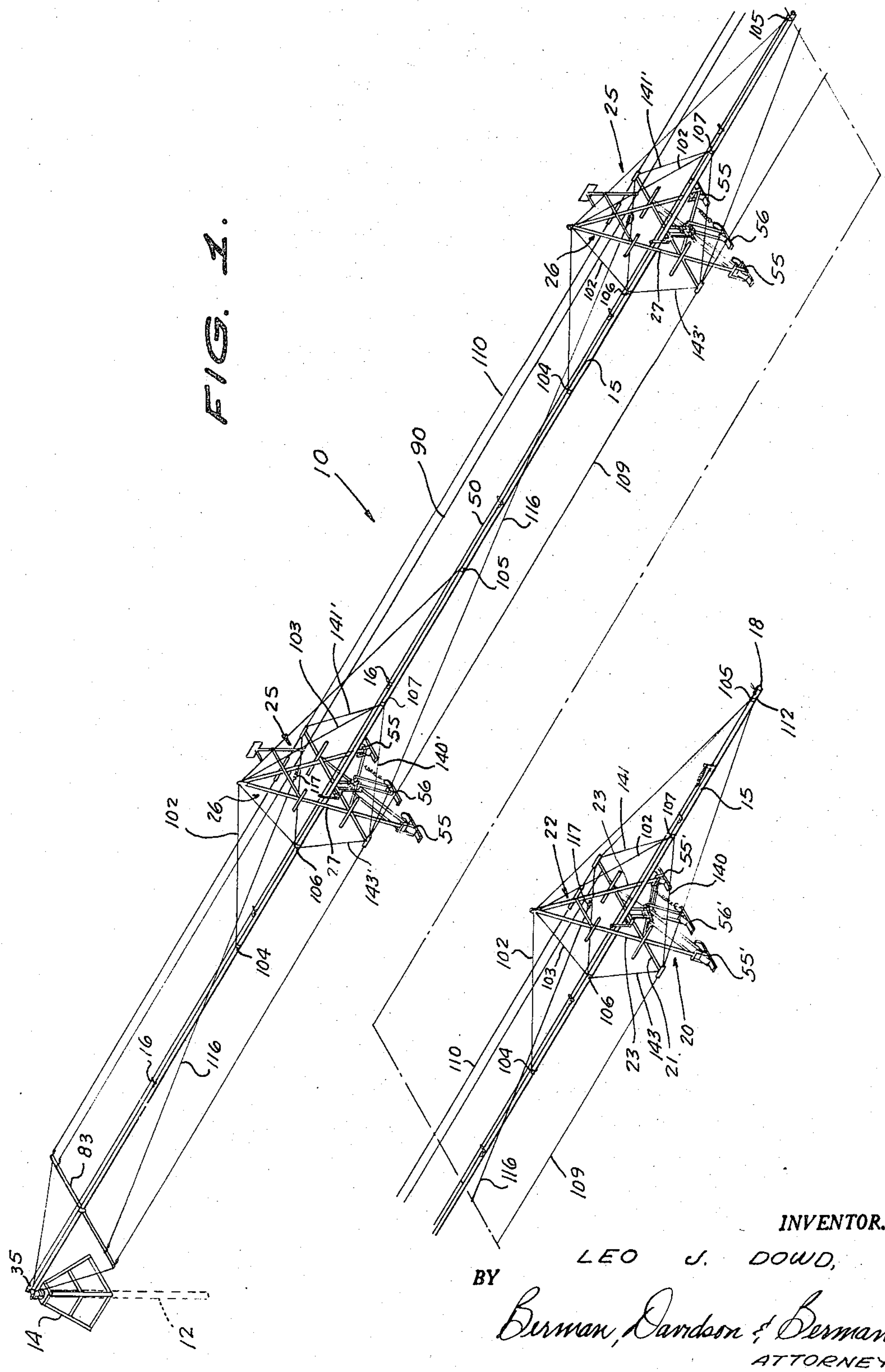
INVENTOR.
LEO J. DOWD,
BY
Berman, Davidson & Berman
ATTORNEYS,

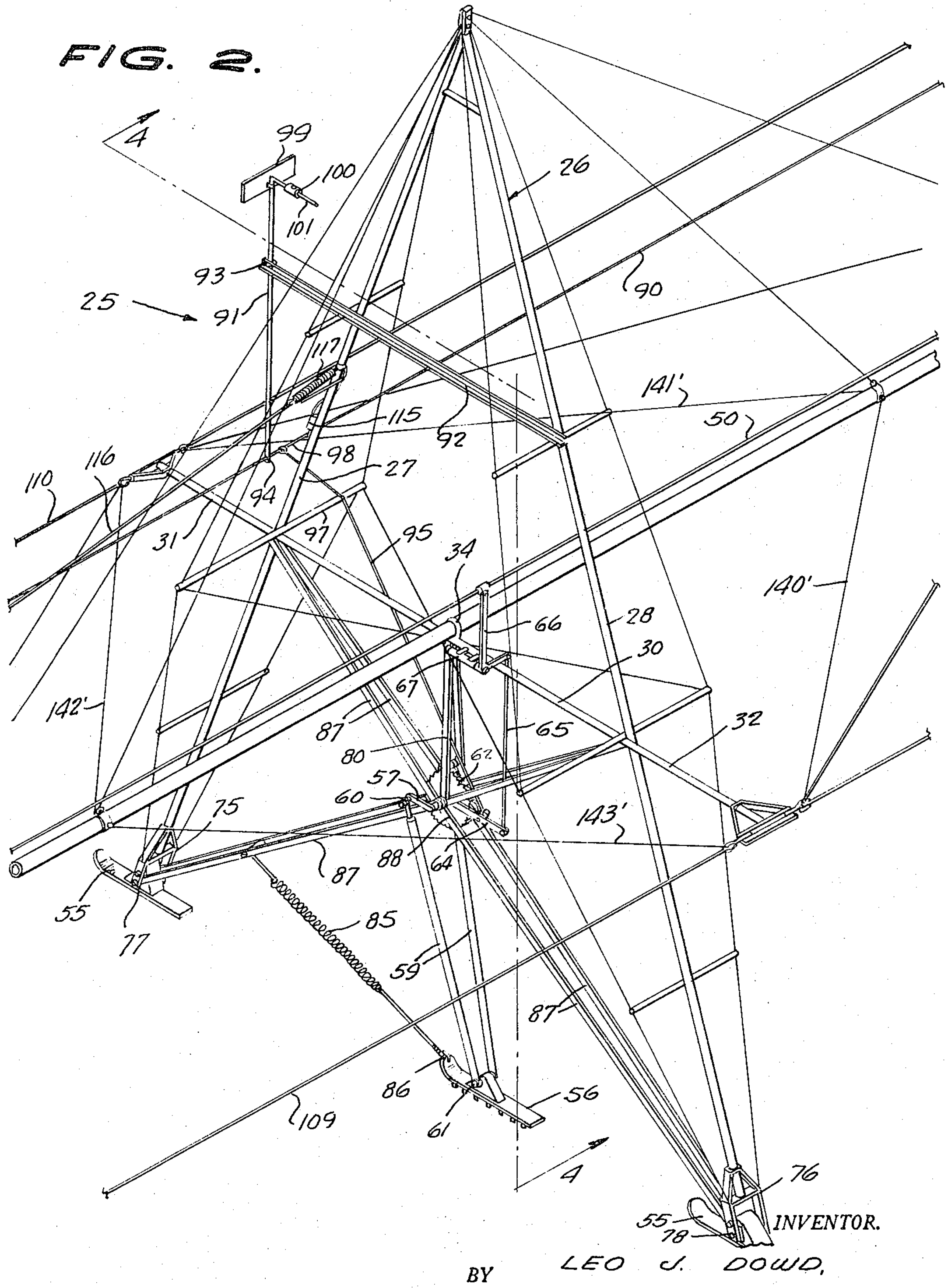
INVENTOR.
BY LEO J. DOWD.
Berman, Davidson & Berman
ATTORNEYS.

March 19, 1968 L. J. DOWD 3,373,939
SELF-PROPELLED IRRIGATION SYSTEM OF THE RECIPROCABLE CABLE TYPE WITH MOBILE SUPPORTS ACTUATED BY PROPELLING SHOES
Filed July 1, 1966
6 Sheets-Sheet 3
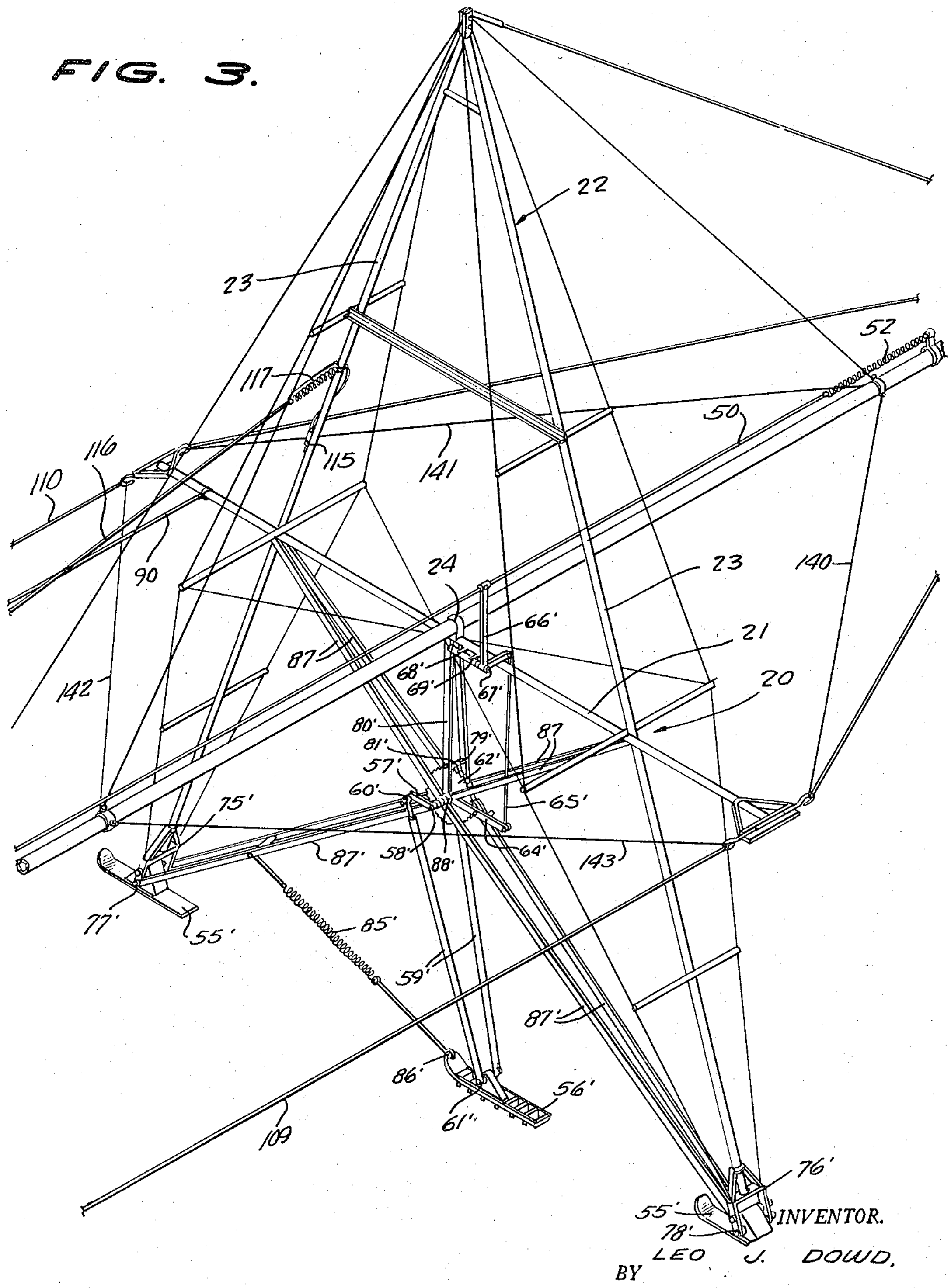
INVENTOR.
LEO J. DOWD.
BY
Berman, Davidson & Berman
ATTORNEYS.

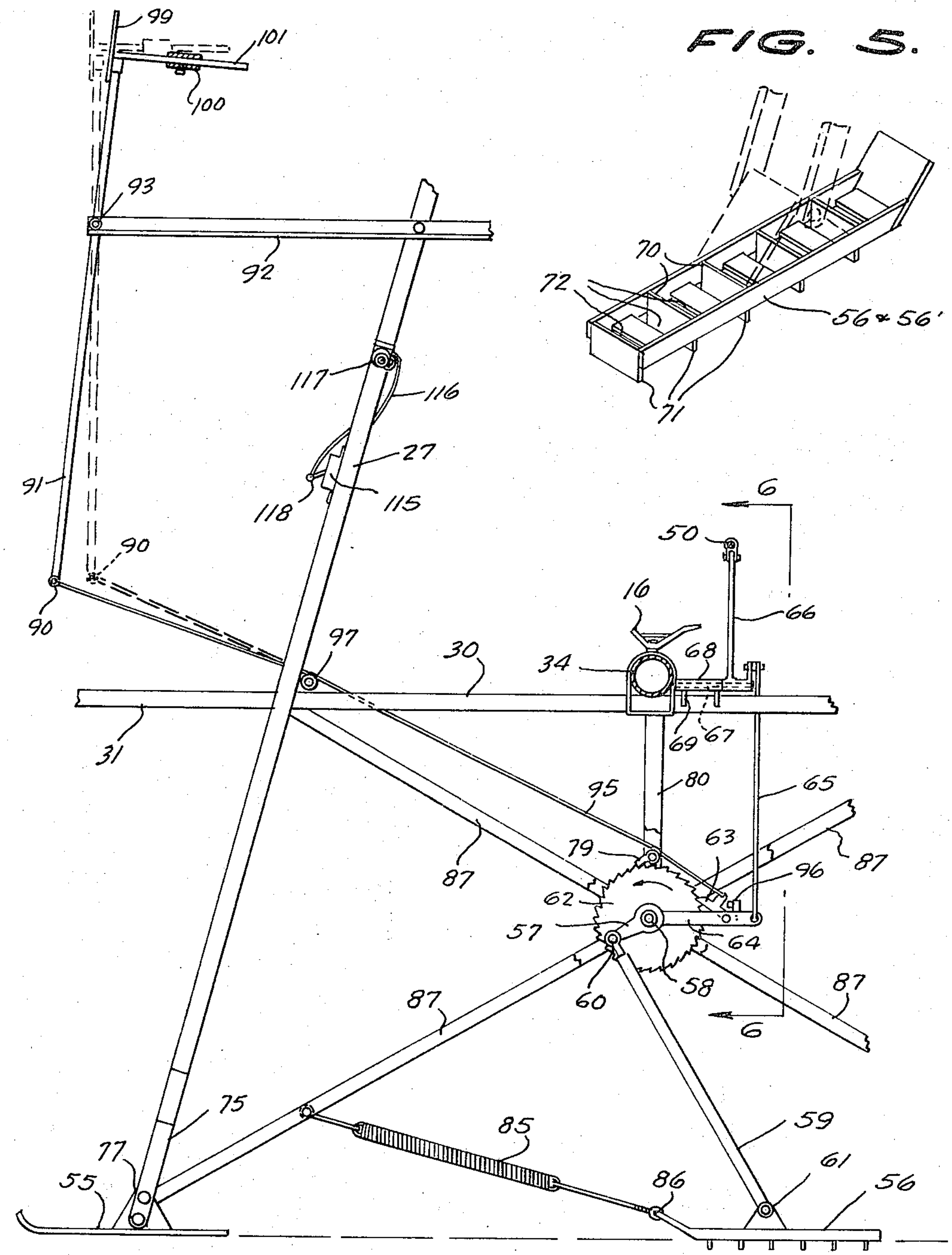
INVENTOR.
LEO J. DOWD,
BY
Berman, Davidson & Berman
ATTORNEYS.

March 19, 1968 L. J. DOWD 3,373,939
SELF-PROPELLED IRRIGATION SYSTEM OF THE RECIPROCABLE CABLE TYPE WITH MOBILE SUPPORTS ACTUATED BY PROPELLING SHOES
Filed July 1, 1966 6 Sheets-Sheet 5
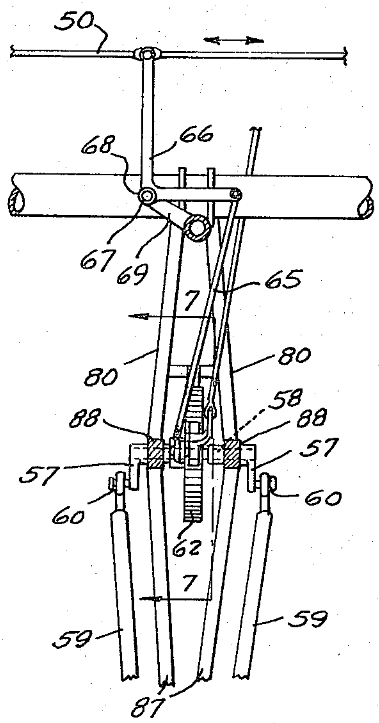
FIG. 6.
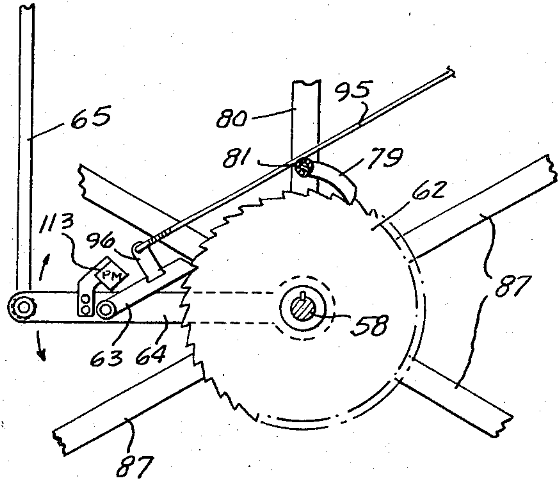
FIG. 7.
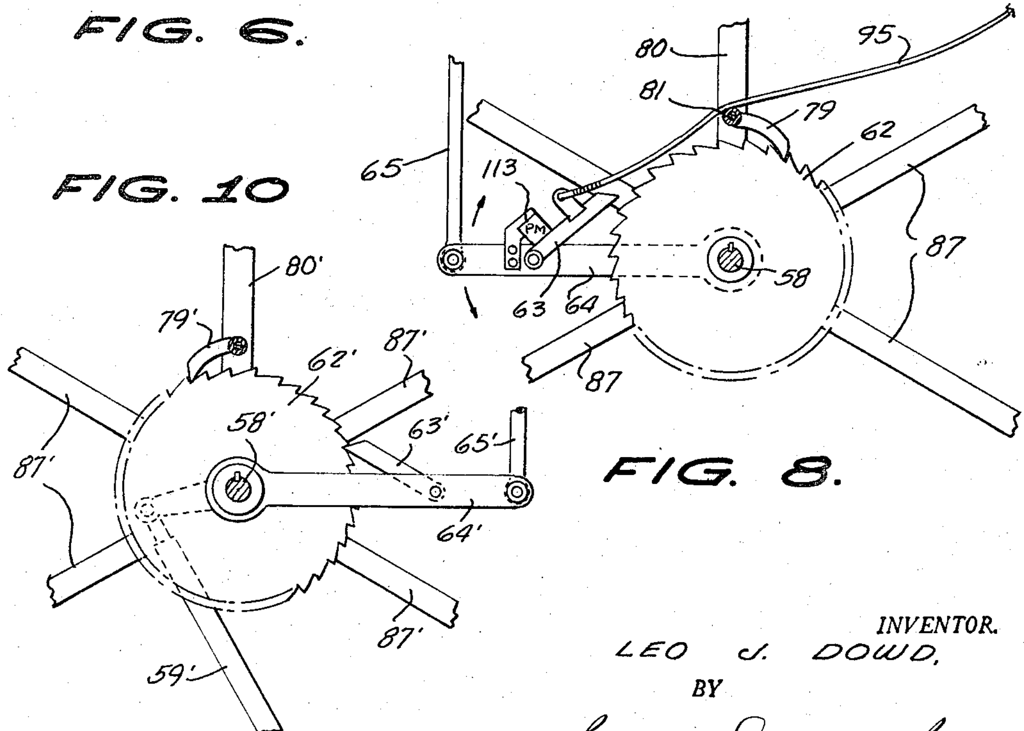
FIG. 10
FIG. 8.
INVENTOR.
LEO J. DOWD,
BY
Berman, Davidson & Berman
ATTORNEYS.

March 19, 1968 L. J. DOWD 3,373,939

SELF-PROPELLED IRRIGATION SYSTEM OF THE RECIPROCABLE CABLE TYPE WITH MOBILE SUPPORTS ACTUATED BY PROPELLING SHOES

Filed July 1, 1966 6 Sheets-Sheet 6

INVENTOR.
LEO J. DOWD,
BY
Berman, Davidson & Berman
ATTORNEYS.

3,373,939

SELF-PROPELLED IRRIGATION SYSTEM OF THE RECIPROCABLE CABLE TYPE WITH MOBILE SUPPORTS ACTUATED BY PROPELLING SHOES

Leo J. Dowd, 117 S. Parkway, Columbus, Nebr. 68601

Filed July 1, 1966, Ser. No. 562,183
5 Claims. (Cl. 239—177)

This invention relates to a self-propelled irrigation system of the reciprocable cable type.

An object of the present invention is to provide a self-propelled irrigation system wherein a reciprocable flexible member is drivingly connected to the ratchet wheel drive means on the mobile main support and each of the intermediate mobile supports, the respective ratchet drive means each including a ground-engaging propelling shoe and a shoe in linear spaced alignment with the propelling shoe and slidably engaging the ground which cause travel together of the main and intermediate supports in longitudinal alignment over the land to be irrigated and consequent rotation of the water-distributing pipe supported on the supports about a supply conduit as an axis.

Another object of the present invention is to provide a self-propelled irrigation system wherein there is a control means on each of the intermediate mobile supports which is operatively connected to the driving dog normally out of driving engagement with the ratchet wheel of the ratchet wheel drive means on each of the intermediate mobile supports, the said control means being operable to actuate the ratchet wheel and the attendant propelling shoe of an intermediate support by shifting the driving dog into driving engagement with the ratchet wheel in accordance with lagging of and out of longitudinal alignment of the intermediate support with the main support and the other intermediate supports, and operable to de-activate the ratchet wheel and the attendant propelling shoe of the intermediate support by shifting the driving dog to its normal out of driving engagement position in accordance with restoration of the intermediate support to the position of longitudinal alignment with the main support and the other intermediate supports.

A further object of the present invention is to provide a self-propelled irrigation system wherein the intermediate mobile supports are provided with means to counteract wind pressure during traveling movement over the land or ground.

Other objects and advantages of the present invention will become apparent from the following description taken in conjunction with the accompanying drawings, in which:

FIGURE 1 is a perspective view, with parts broken away, of the self-propelled irrigation system according to the present invention.

FIGURE 2 is an enlarged perspective view of one of the intermediate mobile supports of the system of FIGURE 1.

FIGURE 3 is an enlarged perspective view of the main mobile support of the system of FIGURE 1.

FIGURE 4 is a sectional view taken on the line 4—4 of FIGURE 2.

FIGURE 5 is a perspective view of the driving ground-engaging shoe of the mobile supports.

FIGURE 6 is a sectional view taken on the line 6—6 of FIGURE 4.

FIGURE 7 is a sectional view taken on the line 7—7 of FIGURE 6.

FIGURE 8 is a view of the assembly of FIGURE 7, but illustrating the driving dog disengaged from the ratchet wheel.

FIGURE 10 is a sectional view similar to FIGURE 7 illustrating the driving dog in driving engagement with the ratchet wheel of the main mobile support.

Figure 9:
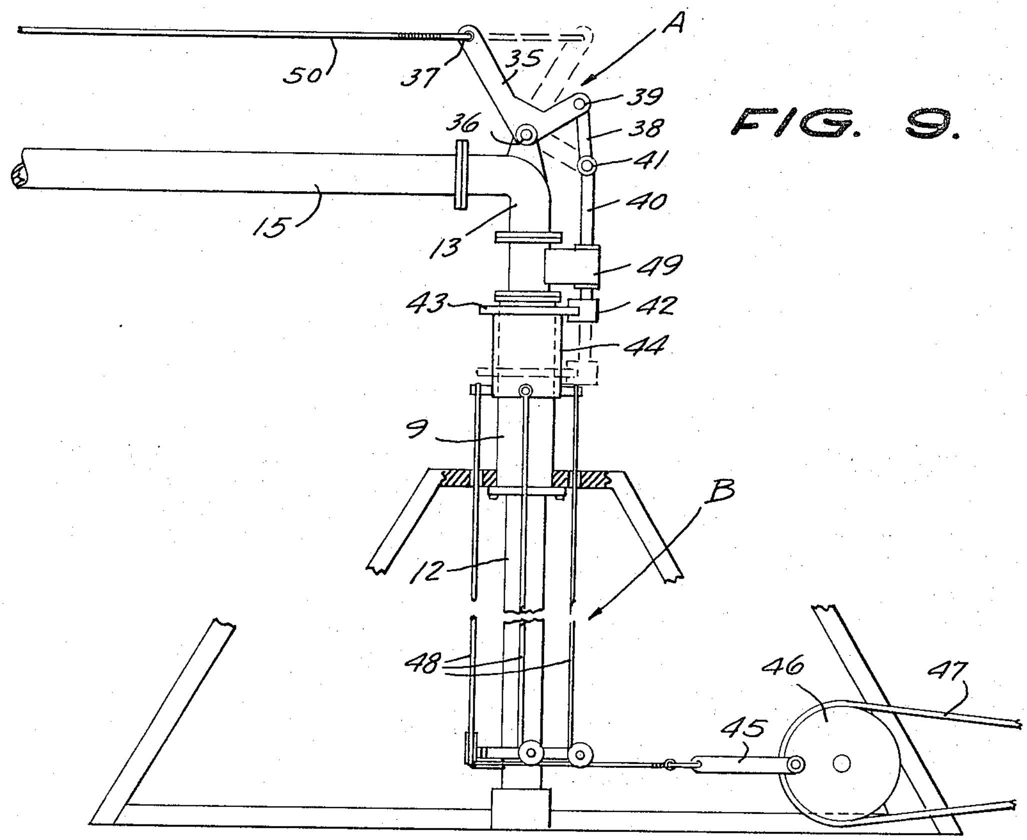
FIGURE 9 is a fragmentary elevational view illustrating the reciprocable flexible member connected to a bell crank lever pivotally-carried by the upstanding supply conduit with a reciprocating imparting means operatively connected to the crank lever.

Referring to the drawings, the numeral 10 designates generally an embodiment of the self-propelled irrigation system according to the present invention. Such system, FIGURE 1, comprises an upstanding water-supply conduit 12 which has its lower end submerged in a well containing water, not shown, the upper end of the conduit 12 being received in one arm of an elbow 13, FIGURE 9, which is supported in the top or apex of a pyramidal-shaped skeleton frame 14 resting upon the surface of the land above the well, the free end of one arm of the elbow 13 and the upper end of the conduit 12 being connected together by a rotary joint 9. An elongated horizontally disposed water-distributing pipe 15 has one end fixedly received in the other arm of the elbow 13. By virtue of the rotary joint 9 the distributing pipe 15 is pivotally-connected to the water-supply conduit 12 for movement of the distributing pipe about the water-supply conduit 12 as an axis. The distributing pipe 15 is made up of a plurality of sections of pipe, the sections being fixedly-connected together in the conventional manner. It is to be noted that the connections of the respective pipe sections are such as to permit limited flexing of the pipe 15. As this forms no part of the invention, no further description appears necessary.

A plurality of discharge nozzles 16 are spaced along the distributing pipe 15 between the ends thereof and serve to spray water onto the land as the distributing pipe 15 moves or travels about the supply conduit 12 as an axis. Inasmuch as the nozzles 16 employed are all of the well-known type and form no part of the invention, further description is deemed unnecessary.

Operatively-associated with the conduit 12 is a pump, not shown, for forcing the water from the well up through the supply conduit 12 and into and out through the pipe 15 to be discharged from the nozzles 16 onto the land underneath.

A main mobile support 20, FIGURE 1, is disposed transversely of the distributing pipe 15 adjacent the other end 18 thereof, and fixedly carries the distributing pipe 15, the pipe 15 being fixedly secured, FIGURE 3, to a horizontally disposed strut 21 extending transversely across and secured to the legs 23 of an upstanding A-frame 22 intermediate the ends thereof. Specifically, the pipe 15 is fixedly secured to the strut 21 by means of an inverted U-shaped clamp 24.

A plurality of intermediate mobile supports 25 are arranged transversely of and at spaced locations along the distributing pipe 15 between the ends thereof. In FIGURE 1, only two of the supports 25 are shown. However, the number of intermediate supports 25 is variable, and depends upon the total length of the distributing pipe 15. If the total length of the distributing pipe is 1300 feet, then the intermediate supports 25 should be located along the pipe 15 at about 20- or 30-foot spacing therebetween. The spacing of the intermediate supports 25 is optional.

A reciprocable flexible member or cable 50 is disposed above and in parallel spaced relation with respect to the distributing pipe 15 and has one end operatively connected to a reciprocating member indicated generally by the letter A, FIGURE 9, and carried by the supply pipe 15, and has the other end connected to a coil spring 52, FIGURE 3, on the other end 18 of the distributing pipe 15. Specifically, the reciprocating member is of the conventional and well-known type and includes a bell crank lever 35 which is pivotally supported on the elbow 13, as at 36, the one end of the flexible member or cable 50 being operatively connected to one arm of the bell crank lever 35, as at 37. The other arm of the bell crank lever 35 is connected to a reciprocating imparting means indicated generally by the letter B. Specifically, the reciprocating imparting means indicated by the letter B comprises a reciprocable collar 44 which is operatively connected to a reciprocating pitman 45 carried by a rotatable pulley 46 which is operatively connected to a power source, not shown, by means of a belt 47, the pitman 45 being connected to the collar 45 by means of a series of reciprocating cables 48 surounding the upstanding conduit 12, and connected to the lower end of the collar 44. The collar 44 is circumposed by a flange 43 which is located adjacent the top of the collar 44 and is fixedly attached thereto, the flange 43 being embraced by a yoke 42 which is carried by the lower end of an arm 40, the upper end of the arm 40 being pivotally connected to one end of a link 38, as at 41. The other end of the link 38 is pivotally connected to the other arm of the bell crank lever 35, as at 39. It is to be noted that the arm 40 works in a guide bearing 49.

On each of the intermediate supports 25 there is a means which supports the adjacent portion of the distributing pipe 15. Since the construction of each intermediate support is the same, only one of such supports will be specifically described.

Referring to FIGURES 1 and 2, the support 25 comprises an upstanding A-frame 26 which includes a pair of upstanding legs arranged in converging relation, the legs being indicated by the numerals 27 and 28 respectively, and an elongated strut 30 extends transversely across and is secured to the legs 27 and 28 intermediate the ends thereof, the strut having one end portion 31 projecting outwardly of the leg 27 and having the other end portion 32 projecting outwardly of the leg 28. The means which supports the adjacent portion of the distributing pipe 15 is the strut 30, and this adjacent portion of the pipe 15, FIGURE 2, is fixedly secured to the strut 30 by means of an inverted U-shaped clamp 34.

The A-frame 26 has the lower end of each of its legs 27 and 28 carrying a shoe 55, each of which slidably engages the ground or land to be irrigated. One shoe 55, FIGURES 2 and 4, is fixedly secured to a forked element 75 which depends from the lower end of leg 27 of the A-frame 26, as at 77, and the other shoe 55, is fixedly secured to a like forked element 76 which depends from the lower end of the leg 28 of the A-frame 26, as at 78. Disposed between the shoes 55 and in linear alignment therewith is a propelling shoe 56, the propelling shoe 56, FIGURES 1, 2 and 4, being pivotally connected to cranks 57 on the opposite ends of a driven shaft 58 by means of a pair of jack shafts 59. One of the complemental ends of the jack shafts 59 is pivotally connected to the cranks 57, as at 60, and the other of the complemental ends of the jack shafts 59 are pivotally connected to the propelling shoe 56, as at 61.

The driven shaft 58 carries a ratchet wheel 62, and cooperatively disposed with respect to the ratchet wheel 62 is a driving dog 63 which is normally out of driving engagement with the ratchet wheel 62, as shown in FIGURE 8, and is mounted so as to be shiftable into driving engagement with the ratchet wheel 62. Specifically, the dog 63 is pivotally carried by an arm 64 supported on the driven shaft 58 for rotation about the shaft 58 as an axis. A jack shaft 65 connects the arm 64 to one arm of a bell crank 66, the bell crank being rockably supported upon a stub shaft 67 carried by the strut 30. Specifically, the stub shaft 67 is supported in a barrel 68 carried by the lug 69 projecting upwardly from the strut 30. Extending through and supported in the free end of the other arm of the bell crank 66 is a flexible member or cable 50.

It is to be noted that the pair of jack shafts 59 which have one of their complemental ends pivotally connected to cranks 57 on the ends of each of the driven shafts 58 carrying the ratchet wheel 62, and which have the other of their complemental ends pivotally connected to each of the adjacent propelling shoes 56 constitute a first means drivingly connecting the propelling shoe 56 on each of the intermediate supports 25 to the adjacent subsidiary ratchet drive means.

A locking dog 79, FIGURES 7 and 8, is cooperatively disposed with respect to each of the ratchet wheels 62 of the intermediate supports 25, the locking dog 79 being pivotally connected, as at 81, to the intermediate portion of a vertically-disposed hanger 80 dependingly carried by the strut 30 of the A-frame 26 of the intermediate support 25. The locking dog 79 engages the teeth of the adjacent ratchet wheel 62. The lower end of the hanger 80 is attached to a pair of bearings 88 supported in radiating braces 87 attached to the legs 27 and 28 of the A-frame 26 of the intermediate support 25.

A coil spring 85 is operatively connected to the propelling shoe 56 and serves to urge the shoe forwardly. As shown in FIGURES 2, 4, the coil spring 85 has one end connected to the tip of the shoe 56, as at 86, and has the other end connected to one of the radiating braces 87.

The lower end of each of the legs 23 of the A-frame 22 of the main mobile support 20, FIGURES 1 and 3, also carries a shoe 55′ each of which slidably engages the ground or land to be irrigated. One shoe 55′, FIGURE 3, is fixedly secured to a forked element 75′ which depends from the lower end of one of the legs 23 of the A-frame 22, as at 77′, and the other shoe 55′ is fixedly secured to a like forked element 76′ which depends from the lower end of the other of the legs 23 of the A-frame 22, as at 78′. Disposed between the shoes 55′ and in linear alignment therewith is a propelling shoe 56′, the propelling shoe being pivotally connected to cranks 57′ on the opposite ends of a driven shaft 58′ by means of a pair of jack shafts 59′. One of the complemental ends of the jack shafts 59′ is pivotally connected to the cranks 57′, as at 60′, and the other of the complemental ends of the jack shafts 59′ are pivotally connected to the propelling shoe 56′, as at 61′. The driven shaft 58′ carries a ratchet wheel 62′.

It is to be noted that the pair of jack shafts 59′ which have one of their complemental ends pivotally connected to cranks 57′ on the ends of the driven shaft 58′ carrying the ratchet wheel 62′, and which have the other of their complemental ends pivotally connected to the propelling shoe 56′ constitute a second means drivingly connecting the propelling shoe 56′ on the main support 20 to the main ratchet drive means also on the main support 20.

Cooperatively disposed with respect to the ratchet wheel 62′ is a driving dog 63′, the dog 63′ being pivotally connected to an arm 64′ supported on the driven shaft 58′ for rotation about the shaft 58′ as an axis. The driving dog 63′ is normally in driving engagement with the ratchet wheel 62′. Thus, the dog 63′ is constantly in driving engagement with the ratchet wheel 62′, as shown in FIGURE 10. A jack shaft 65′ connects the arm 64′ to one arm of a bell crank 66′, the bell crank being rockably supported upon a stub shaft 67′ carried by the strut 21. Specifically, the stub shaft 67′ is supported in a barrel 68′ carried by the lug 69′ projecting upwardly from the strut 21. Extending through and supported in the free end of the other arm of the bell crank 66′ is a flexible member or cable 50. A locking dog 79′, FIGURE 3, is cooperatively disposed with respect to the ratchet wheel 62′ of the main support 20, the locking dog 79′, FIGURE 3, being pivotally connected, as at 81′, to the intermediate portion of a vertically disposed hanger 80′ dependingly carried by the strut 21 of the A-frame 22 of the main support 20. The locking dog 79′ engages the teeth of the adjacent ratchet wheel 62′. The lower end of the hanger 80′ is attached to a pair of bearings 88′ supported in radiating braces 87′ attached to the legs 23 of the A-frame 22 of the main support 20.

A coil spring 85′ is operatively connected to the propelling shoe 56′ and serves to urge the shoe forwardly. As shown in FIGURE 3, the coil spring 85′ has one end connected to the tip of the shoe 56′, as at 86′, and has the other end connected to one of the radiating braces 87′.

The propelling shoes 56 and 56′, FIGURE 5, comprise a rectangular enclosure which has a plurality of tranversely-disposed partitions 70 arranged in longitudinal spaced relation within the enclosure, the partitions having the lower end portions extending below the bottom of the enclosure and serving as ground-engaging cleats 71, the spaces between the partitions, and indicated by the numeral 72, serving as ingress means for the admission of ground or soil therethrough.

It is to be noted that the main mobile support 20 is constantly driven by the flexible member 50, and by virtue of it being so driven, effects the rotation of the distributing pipe 15 about the supply conduit 12 as an axis, the intermediate mobile supports 25 with their ratchet wheel drive means deactivated, traveling along with and in longitudinal alignment with the main support 20. Should one or more of the intermediate supports 25 lag behind and become out of longitudinal alignment with the main support 20 and the other intermediate supports 25, the ratchet wheel drive means of said lagging supports 25 is activated, and thereby positively driven, this driving being continued until the said lagging support or supports 25 have been restored to position of longitudinal alignment with the main support 20 and the other intermediate supports 25 whereupon the ratchet wheel drive means of said restored intermediate support or supports are deactivated.

On each of the intermediate supports 25 only there is provided a control means which is operatively connected to each of the subsidiary ratchet wheel drive means, the control means being operable to activate the ratchet wheel and the attendant drive means of an intermediate mobile support 25 in accordance with lagging behind of and out of longitudinal alignment of said intermediate support with the main mobile support 20 and the other intermediate supports 25, being operable to deactivate the ratchet wheel and the attendant drive means of said intermediate support in accordance with restoration of said intermediate support to the positions of longitudinal alignment with the main mobile support and the other intermediate supports. This control means, FIGURES 1, 2, 7 and 8, comprises an actuating flexible cable 90 which extends along and in parallel relation with respect to the distributing pipe 15 and having one end attached to a cross-beam 83 supported on the portion of the distributing pipe 15 adjacent the skeleton frame 14, and having the other end attached to the strut 21 of the A-frame 22 of the main support 20. A rigid upstanding operator 91 provided with an eye 94 at its lower end is positioned within the A-frame 26 of each of the intermediate supports 25, and each operator 91 is mounted upon the actuating cable 90 as by having the adjacent portion of the cable 90 extending slidably through the eye 94. Each operator 91 is mounted on a crossbar 92 which is carried by the A-frame 26 of the intermediate supports 25 for rocking movement about a horizontal axis 93 intermediate its ends. Means operatively connects each of the driving dogs 63 of the subsidiary ratchet drive means of the intermediate supports 25 to the adjacent portions of the actuating cable 90 for movement of the driving dog 63 from the outer driving engagement position, as illustrated in FIGURE 8, into driving engagement with the adjacent ratchet wheel 62 responsive to movement imparted to the actuating cable 90 by lagging behind of the adjacent intermediate support 25, as illustrated in FIGURE 7. This last-mentioned means comprises a flexible cord 95 which has one end pivotally attached to an ear 96 projecting from the driving dog 63, the cord 95 extending over and bearing upon a horizontally disposed rod 97 supported on the A-frame 26 of the adjacent intermediate support 25 with the other end pivotally attached to the actuating cable 90, as at 98.

Rising from the upper end of each of the operators 91 is an upstanding vane 99 which is arranged so as to counteract wind pressure that may be exerted upon the actuating flexible cable 90 during travel of the distributing pipe 15 about the supply conduit 12 as an axis. Each of the operators 91 carries a weight 100, the weight being adjustable along an extension 101 projecting perpendicularly inwardly from the upper end of the operator. The weight 100 serves to adjust any misalignment of the mobile supports 20 and 25 of the system.

Cooperatively disposed with respect to the driving dog 63 of each of the subsidiary ratchet drive means of the intermediate mobile supports 25, FIGURES 7 and 8, is a permanent magnet 113 which acts to attract and hold the driving dog 63 out of driving engagement with the ratchet wheel 62, the position of FIGURE 8. Of course, whenever the flexible cord 95 is actuated by movement of an intermediate mobile support 25 out of longitudinal alignment with the main and other intermediate supports, the dog 63 is pulled into driving engagement with the ratchet wheel 62 against the attraction exerted by the adjacent permanent magnet 113. When the intermediate support has been restored to longitudinal alignment with the main and other intermediate supports the cord 95 becomes slack, permitting the permanent magnet 113 to attract the dog 63 to itself, and thereby restore the dog 63 to its normal position of out of driving engagement with the ratchet wheel 62.

A guy cable construction is provided for connecting the A-frame 22 of the main mobile support 20 and the A-frames 26 of the intermediate supports 25 together and holding the respective supports in alignment. Such construction comprises a cable 102 having its mid-point stretched over and attached to the apex of the A-frame 22 of the main mobile support 20, and over that of each of the A-frames 26 of the intermediate mobile supports 25 with its ends attached to the water-distributing pipe 15, as at 104 and 105, FIGURE 1, and a shorter cable 103 having its mid-point stretched over and attached to the apex of the A-frame 22 of the main mobile support 20 and over that of each of the A-frames 26 of the intermediate supports 25, with its ends fixedly attached to the water-distributing pipe 15, as at 106 and 107. Also, serving as guys are cables 109 and 110 which are disposed on opposite sides of the distributing pipe 15 and extend in parallel spaced relation along the distributing pipe 15, the intermediate portions of the cables 109 and 110 being supported in the end portions 31 and 32 of the struts 30 of the frames 26 of the intermediate supports 25 and the complemental ends of the struts 21 of the frame 22 of the main support 20 with the complemental one ends being attached to the cross-beam 83, FIGURE 1, and the complemental other ends being secured to the distributing pipe 15, as at 112, FIGURE 1.

By reference to FIGURES 1 and 3, it will be seen that a box-shaped cable construction encompasses the portion of the distributing pipe 15 within the A-frame 22 of the main frame 20, such construction comprising a first cord 140 extending from one end of the strut 21 and secured to the adjacent portion of the distributing pipe 15; a second cord 141 extending from the distributing pipe 15 and secured to the other end of the strut 21; a third cord 142 extending from the other end of the strut 21 and secured to the adjacent portion of the distributing pipe 15; and a fourth cord 143 extending from the distributing pipe 15 and secured to the one end of the strut 21.

Each of the intermediate mobile supports 25 has a box-shaped construction like that above-described in connection with the main mobile support 20. By reference to FIGURES 1 and 2, it will be apparent that the box-like construction which encompasses the portion of the distributing pipe 15 within the A-frame 26 of each of the intermediate mobile supports 25 comprises a first cord 140' extending from one end of the strut 30 and secured to the adjacent portion of the distributing pipe 15; a second cord 141' extending from the distributing pipe 15 and secured to the other end of the strut 30; a third cord 142' extending from the other end of the strut 30 and secured to the adjacent portion of the distributing pipe 15; and a fourth cord 143' extending from the distributing pipe 15 and secured to the one end of the strut 30.

In operation, whenever an intermediate support 25 lags behind or is out of longitudinal alignment with the main support 20 and the other intermediate supports 25, the actuating flexible cable 90 shifts from the position shown in full lines in FIGURE 4 to the position shown in dotted lines in FIGURE 4, thereby causing the operator 91 to move from the position shown in full lines in FIGURE 4 to the position shown in dotted lines in FIGURE 4, exerting a pull on the slacked cord 95 to place the cord under tension and moving the driving dog 63 from the normal out of driving engagement position with respect to the ratchet wheel 62, as illustrated in FIGURE 8, and into driving engagement with the ratchet wheel 62, as illustrated in FIGURE 7, against the attractive force of the permanent magnet 113, resulting in actuation of the ratchet wheel 62 and the attendant propelling shoe 56 and sliding shoes 55. With the restoration of the intermediate support 25 to the position in longitudinal alignment with the main support 20 and the other of the intermediate supports 25, the subsidiary ratchet wheel drive means of said support is deactivated by shifting of the actuating cable 90 from the dotted line position shown in FIGURE 4 to the normal full line position shown in FIGURE 4, thereby causing the operator 91 to move from the dotted line position of FIGURE 4 to the normal full line position of FIGURE 4, slackening the tension on the cord 95 and permitting the driving dog 63 to move from the driving engagement position with respect to the ratchet wheel 62 to the normal out of driving engagement position and attractively being engaged by the magnet 113, as shown in FIGURE 8, resulting in the deactivation of the ratchet wheel 62 and the attendant propelling and sliding shoes 56 and 55.

The irrigation system of the present invention is provided with a safety stop mechanism, such mechanism being operatively connected to individual switches on all of the main and intermediate mobile supports 20 and 25, the switches being connected together in series. Specifically, the switches on all of the mobile supports are indicated by the numeral 115, and are selectively operated by means of a flexible actuator 116. As shown in FIGURES 1, 2 and 3, an actuator 116 has one end attached to the cross-beam 83 and extends diagonally from the cross-beam 83 to the forward side of the A-frame 26 of the first intermediate or adjacent mobile support 25, and has its other end operatively connected to the adjacent part of said A-frame as by attachment of a portion adjacent the other end of the actuator to one end of a coil spring 117 carried by the A-frame 26, the other end portion of the actuator having slack therein and being secured to the arm 118 of the switch 115, FIGURE 4. An actuator corresponding to actuator 116 extends diagonally from the first intermediate support 25 to the next adjacent or second intermediate support 25, and has one end attached to the strut 30 of the first support and has the other end connected to a coil spring 117 and to the arm 118 of the switch 115 of the second support in the same manner as previously described. Like actuators are similarly connected between other adjacent intermediate supports and between the main support 20 and the adjacent intermediate support 25.

Figure 11:
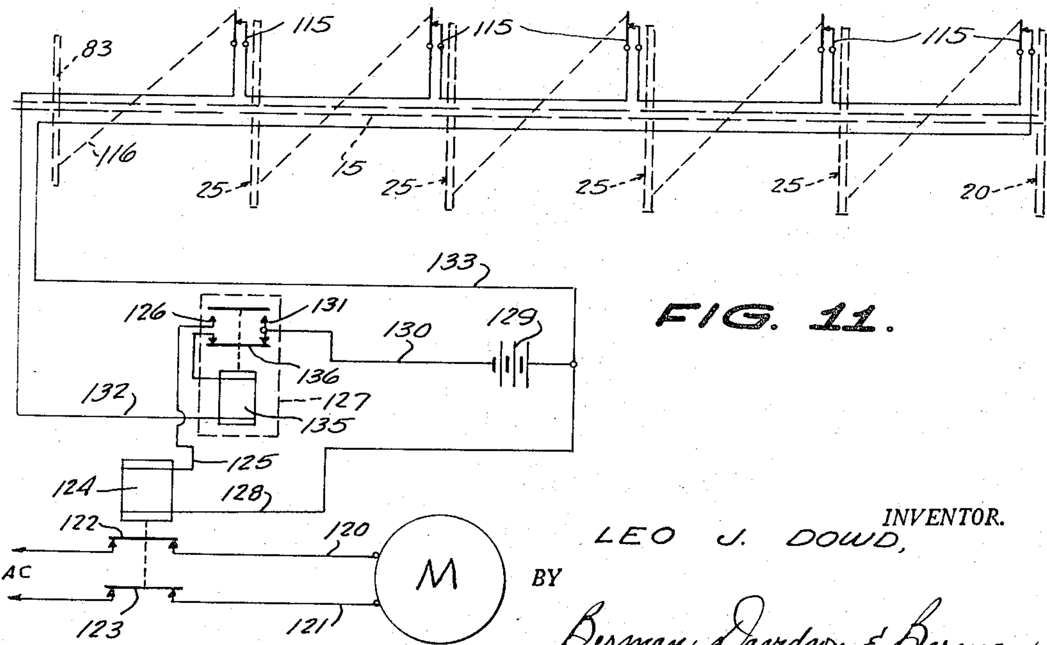
FIGURE 11 is a diagram illustrating the electrical circuit in association with the main and intermediate supports.

Referring to FIGURE 11, the letter M indicates a motor which is electrically connected to a pair of conductors 120, 121, the conductors having switches 122 and 123, respectively. A solenoid 124 is cooperatively disposed with respect to the switches 122 and 123, the solenoid serving to shift the switches to open position upon energization thereof. A conductor 125 connects the solenoid 124 to a contact 126 of a relay 127, and a conductor 128 connects the solenoid 124 to the positive pole of a battery 129. A conductor 130 connects the negative pole of the battery 129 to the other contact 131 of the relay 127. A conductor 132 connects the relay 127 to the switches 115, and a conductor 133 connects the switches 115 to the positive pole of the battery 129.

In operation, assuming that one of the intermediate supports 25 or main support 20 should lag behind or advance out of longitudinal alignment, the corresponding actuator 116 will be operated, resulting in the arm 118 of the adjacent switch 115 breaking contact, deenergizing the relay, breaking the circuit with the solenoid 135, shifting the contact bar 136 into switching contact with the contacts 126 and 131, energizing the solenoid 124, and breaking the contacts 122 and 123, causing the motor M to stop.

What is claimed is:

1. A self-propelled irrigation system comprising an upstanding water-supply conduit, an elongated horizontally disposed water-distributing pipe having one end pivotally connected to said supply conduit for movement of said distributing pipe about said supply conduit as an axis, a main mobile support disposed transversely of said distributing pipe adjacent the other end thereof and fixedly carrying said distributing pipe, a plurality of discharge nozzles spaced along said distributing pipe between the ends thereof for spraying water onto the land as said distributing pipe moves about said supply conduit as an axis, a plurality of intermediate mobile supports arranged transversely of and at spaced locations, along said distributing pipe between said main support and said one end of said pipe, means on each intermediate support supporting the adjacent portion of said distributing pipe, a reciprocable flexible member disposed in parallel spaced relation with respect to said distributing pipe and having one end operatively connected to said supply conduit and having the other end operatively connected to the other end of said distributing pipe, each of said main and intermediate supports being provided with a ground-engaging propelling shoe and a shoe arranged in linear alignment with respect to said propelling shoe and slidably engaging the ground, a main ratchet drive wheel means on said main support and drivingly connected to said flexible member, a subsidiary ratchet drive wheel means on each of said intermediate supports and drivingly connected to said flexible member, a first means drivingly connecting the propelling shoe on each of said intermediate supports to the adjacent subsidiary ratchet drive means, a second means drivingly connecting the propelling shoe on said main support to said main ratchet drive wheel means also on said main support, and a control means operatively connected to the ratchet wheel of each subsidiary ratchet drive wheel means and operable to activate the ratchet wheel and the attendant propelling shoe of an intermediate support in accordance with lagging of and out of longitudinal alignment of said intermediate support with the main support and the other intermediate supports, and operable to deactivate the ratchet wheel and the attendant propelling shoe of said intermediate support in accordance with restoration of said intermediate support to the position of longitudinal alignment with the main support and the other intermediate supports.

2. The system according to claim 1, wherein said main ratchet drive wheel means includes a rotatable ratchet wheel carried by a driven shaft, and each of said subsidiary ratchet drive wheel means includes a rotatable ratchet wheel carried by a driven shaft, wherein said first means comprises a pair of jack shafts having one of their complemental ends pivotally connected to cranks on the opposite ends of each of the driven shafts carrying rotatable ratchet wheels of the subsidiary ratchet drive wheel means and having the other of their complemental ends pivotally connected to each of the adjacent propelling shoes of the intermediate mobile supports, and wherein said second means comprises a pair of jack shafts having one of their complemental ends pivotally connected to cranks on the opposite ends of a driven shaft carrying a rotatable ratchet wheel of the main ratchet drive means and having the other of their complemental ends pivotally connected to the propelling shoe of the main mobile support.

3. The system according to claim 1, wherein each of said subsidiary ratchet drive wheel means comprises a rotatable ratchet wheel and a driving dog cooperatively arranged with respect to said ratchet wheel and normally out of driving engagement with said ratchet wheel and shiftable into driving engagement with said ratchet wheel; and wherein said control means includes an actuating flexible cable extending along and in parallel relation with respect to said distributing pipe and having one end operatively connected to the distributing pipe and having the other end operatively connected to said main support, a rigid upstanding operator mounted on each of said intermediate supports for rocking movement about a horizontal axis intermediate its ends and having the lower end pivotally connected to the adjacent portion of said cable, and means operatively connecting each of said driving dogs of said subsidiary ratchet drive wheel means to the adjacent portions of said actuating cable for movement of each of said dogs from the out of driving engagement position into driving engagement with the adjacent ratchet wheel responsive to movement imparted to said actuating cable by lagging behind of the adjacent intermediate support.

4. The system according to claim 3 which includes in addition a vane on the upper end of each of said operators which is arranged so as to counteract wind pressure that may be exerted upon said actuating cable during travel of said distributing pipe about said supply conduit as an axis.

5. The system according to claim 3 which includes in addition a permanent magnet cooperatively disposed with respect to each of the driving dogs of said subsidiary ratchet drive wheel means and serving to attract and hold the adjacent driving dog in its out of driving engagement position.

References Cited

UNITED STATES PATENTS

| | | | |
|---|---|---|---|
| 858,033 | 6/1907 | Silver et al. | 180—4 |
| 1,192,752 | 7/1916 | Chapman et al. | 180—4 |
| 1,617,529 | 2/1927 | Kundrat | 180—4 X |
| 2,604,359 | 7/1952 | Zybach | 239—177 |
| 2,893,643 | 7/1959 | Gordon | 239—177 X |
| 3,268,174 | 8/1966 | Boone | 239—212 |
| 3,302,656 | 2/1967 | Boone | 239—177 X |

M. HENSON WOOD, Jr., *Primary Examiner.*

VAN C. WILKS, *Assistant Examiner.*